United States Patent
Yoshida et al.

(10) Patent No.: US 8,630,020 B2
(45) Date of Patent: Jan. 14, 2014

(54) INFORMATION PROCESSING APPARATUS AND CONTROL METHOD THEREFOR, AND PRINT APPARATUS AND CONTROL METHOD THEREFOR

(75) Inventors: Keita Yoshida, Tokyo (JP); Nobuo Oshimoto, Kawasaki-shi (JP); Tomoko Shintani, Tokyo (JP); Nobuyuki Imai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 410 days.

(21) Appl. No.: 12/626,154

(22) Filed: Nov. 25, 2009

(65) Prior Publication Data

US 2010/0141971 A1 Jun. 10, 2010

(30) Foreign Application Priority Data

Dec. 8, 2008 (JP) ................................. 2008-312491

(51) Int. Cl.
*G06F 15/00* (2006.01)

(52) U.S. Cl.
USPC ........................... 358/1.9; 358/1.15; 358/1.13

(58) Field of Classification Search
None
See application file for complete search history.

(56) References Cited

U.S. PATENT DOCUMENTS

| | | | |
|---|---|---|---|
| 6,167,218 A | | 12/2000 | Kanazawa et al. |
| 7,839,532 B2 * | | 11/2010 | Brawn et al. ................. 358/1.18 |
| 2002/0163537 A1 * | 11/2002 | Vernier et al. ................. 345/751 |
| 2004/0090548 A1 * | 5/2004 | Obrador .................... 348/333.01 |
| 2004/0114193 A1 * | 6/2004 | Inage et al. .................... 358/302 |
| 2005/0237588 A1 * | 10/2005 | Gohara et al. ................. 358/538 |
| 2006/0087670 A1 * | 4/2006 | Smith .......................... 358/1.13 |
| 2007/0041029 A1 * | 2/2007 | Yoo ............................... 358/1.13 |
| 2007/0092118 A1 * | 4/2007 | Tachibana ..................... 382/125 |
| 2007/0226636 A1 * | 9/2007 | Carpenter et al. ............ 715/751 |
| 2009/0091770 A1 * | 4/2009 | Kano et al. ..................... 358/1.1 |
| 2009/0284495 A1 * | 11/2009 | Geaghan et al. .............. 345/174 |
| 2009/0303514 A1 * | 12/2009 | Puigardeu et al. ........... 358/1.13 |
| 2010/0083109 A1 * | 4/2010 | Tse et al. ....................... 715/702 |

FOREIGN PATENT DOCUMENTS

| | | |
|---|---|---|
| JP | 2000-181292 | 6/2000 |
| JP | 2001-270163 | 10/2001 |
| JP | 2002-122948 A | 4/2002 |
| JP | 2003-158707 A | 5/2003 |
| JP | 2003-345511 | 12/2003 |
| JP | 2006-212888 | 8/2006 |
| JP | 2006-343514 | 12/2006 |
| JP | 2007-241130 | 9/2007 |
| JP | 2008-090385 | 4/2008 |
| JP | 2008-171066 | 7/2008 |
| JP | 2009-244725 A | 10/2009 |

* cited by examiner

*Primary Examiner* — Twyler Haskins
*Assistant Examiner* — Helen Q Zong
(74) *Attorney, Agent, or Firm* — Cowan, Liebowitz & Latman, P.C.

(57) ABSTRACT

In the case that a plurality of users execute output reservations while looking at targets to be output together, the necessity for an operation to sort the output materials by user after output is eliminated. The plurality of users are classified, the plurality of targets to be output selected in a scattered manner by the plurality of classified users are bulked together as selected targets to be output for each user, and those bulked targets to be output are output for each user.

7 Claims, 8 Drawing Sheets

5a: `<sequence><photo id="IMG_0001.JPG"><photo id="IMG_0002.JPG"><photo id="IMG_0003.JPG"><photo id="IMG_0004.JPG"><photo id="IMG_0005.JPG"><photo id="IMG_0006.JPG"><photo id="IMG_0007.JPG"><photo id="IMG_0008.JPG"><photo id="IMG_0009.JPG"><photo id="IMG_0010.JPG"></sequence>`

5b: `<sequence><photo id="IMG_0001.JPG" user="A, B"><photo id="IMG_0002.JPG"><photo id="IMG_0003.JPG"><photo id="IMG_0004.JPG"><photo id="IMG_0005.JPG"><photo id="IMG_0006.JPG"><photo id="IMG_0007.JPG"><photo id="IMG_0008.JPG"><photo id="IMG_0009.JPG"><photo id="IMG_0010.JPG"></sequence>`

INFORMATION PROCESSING APPARATUS AND CONTROL METHOD THEREFOR, AND PRINT APPARATUS AND CONTROL METHOD THEREFOR

BACKGROUND OF THE INVENTION

1. Field of the Invention

The present invention relates to an information processing apparatus, and particularly relates to a print apparatus such as a printer or the like capable of printing image data or the like.

2. Description of the Related Art

Recently, print apparatuses that are provided with a user operation unit such as keys and a touch panel, etc., and allow a user to make various print settings and input operations for print data have appeared. For example, in the case that a touch panel is used, the print apparatus displays a graphical user interface (hereinafter called a "GUI") of soft keys or various menus, etc., on the screen. Then, by touching that GUI, a user can execute various functions corresponding thereto, or input characters and numerical values. Also, in the case that a plurality of targets to be output that are to be printed exist, the print apparatus executes sequential display of the targets to be output or list-display of those targets. Furthermore, by directly touching the target that the user wishes to print, the user can designate that object as a print object (hereinafter called "print reservation").

Japanese Patent Laid-Open No. 2006-212888 discloses technology that prevents printing materials of one user from getting mixed into the printing materials of another user by rearranging the printing jobs issued by a plurality of users such that the printing jobs of a single user are continuous.

Furthermore, Japanese Patent Laid-Open No. 2008-090385 discloses technology that, in the case that the printing jobs of a plurality of users are accumulated in an accumulating unit, changes the printing order of printing jobs in the accumulating unit such that printing jobs of a single user are continuous and prints them.

Japanese Patent Laid-Open No. 2001-270163 discloses technology that inserts a partition sheet between jobs, and technology that changes the discharge bin in accordance with print job settings stored in a memory along with image data.

However, in these conventional structures, in the case that print objects are displayed sequentially or as a list, and each user executes a print reservation while a plurality of users view the print objects together, it has been impossible to specify which user made a print reservation for which print object. For this reason, print objects for which each user made a print reservation were printed in a mixed up state, and an operation to sort the printed material while confirming which user made a print reservation for which print object was necessary.

The present invention was made in consideration of such problems and provides equipment of making unnecessary an operation to sort targets to be output for each user after output, which has until now been necessary, in the case that a plurality of users execute an output reservation for targets to be output.

SUMMARY OF THE INVENTION

Accordingly, the information processing apparatus of the present invention comprises: a display unit for displaying targets to be output, an input unit for receiving a plurality of instruction inputs to a single input area to select the targets to be output, a determination unit for determining the classifications of the plurality of instruction inputs, and an output unit for bulking the targets to be output for each classification determined by the determination unit and outputting the targets.

Furthermore, a control method of the information processing apparatus of the present invention comprises the following steps of: a step in which a display unit displays one or a plurality of a targets to be output, a step in which an input unit receives instruction inputs that select targets to be output displayed on the display unit, a step of determining the classifications of the instruction inputs based on the instruction inputs received by the input unit, a step in which a registering unit associates the targets to be output selected by the instruction inputs with the classifications determined by the determination unit and registers them, and an step in which an output means bulks the targets to be output registered by the registering unit for each the classification and outputs them.

Furthermore, a print apparatus of the present invention comprises: an input unit for receiving instruction inputs that select one or a plurality of print objects displayed on the display unit, a determination unit for determining the classifications of the instruction inputs based on the instruction inputs received by the input unit, a registering unit for associating the print objects selected by the instruction inputs with the classifications determined by the determination unit and registering the print objects, and a print unit for bulking the print objects registered by the registering unit and printing the targets.

Furthermore, a control method of the print apparatus of the present invention comprises the following steps of: a step in which a display unit displays one or a plurality of print objects, a step in which an input unit receives instruction inputs that select print objects displayed on the display unit, a step in which a determination unit classifies the instruction inputs based on the instruction inputs received by the input unit, a step in which a registering unit associates the print objects selected by the instruction inputs with the classifications determined by the determination step and registers the print objects, and a step in which a print means bulks the print objects registered by the registering step for each the classification and prints the print objects.

In the case that a plurality of users executes output reservation of targets to be output, an operation to sort the output targets after output, which has been necessary until now, becomes unnecessary.

Further features of the present invention will become apparent from the following description of exemplary embodiments with reference to the attached drawings.

DESCRIPTION OF THE EMBODIMENTS

The objective of the present invention was realized by an information processing apparatus that is provided with a touch panel, and to which a user can give various instructions and inputs through the touch panel.

<First Embodiment>

Details will be explained using as an example the print apparatus according to the first embodiment of the information processing apparatus of the present invention.

Figure 1:
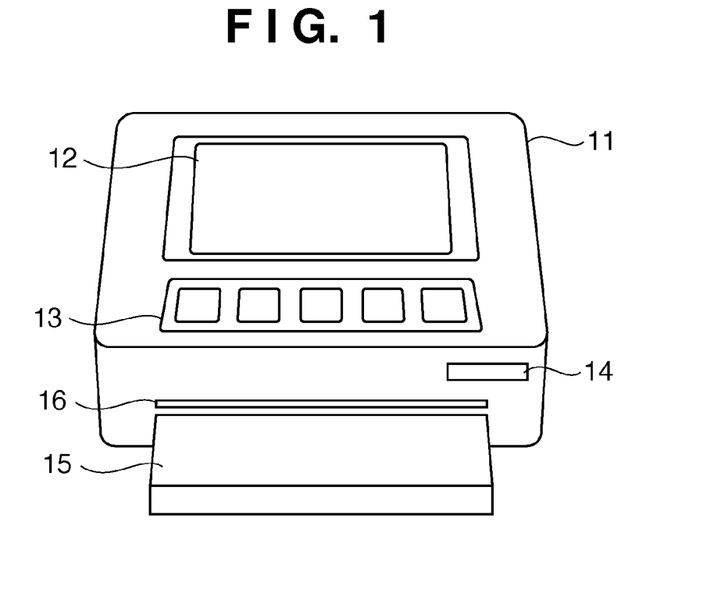
FIG. 1 is an oblique perspective diagram illustrating an example of the external appearance of the print apparatus according to the first embodiment of the present invention.

FIG. 1 is an oblique perspective diagram illustrating an example of the external appearance of the print apparatus according to the first embodiment of the present invention.

In FIG. 1, the print apparatus 11 is provided with a touch panel (screen) 12, key operation unit 13, data input unit 14, sheet supply unit 15, sheet discharge unit 16, and print unit 17 (not shown).

Figure 2:
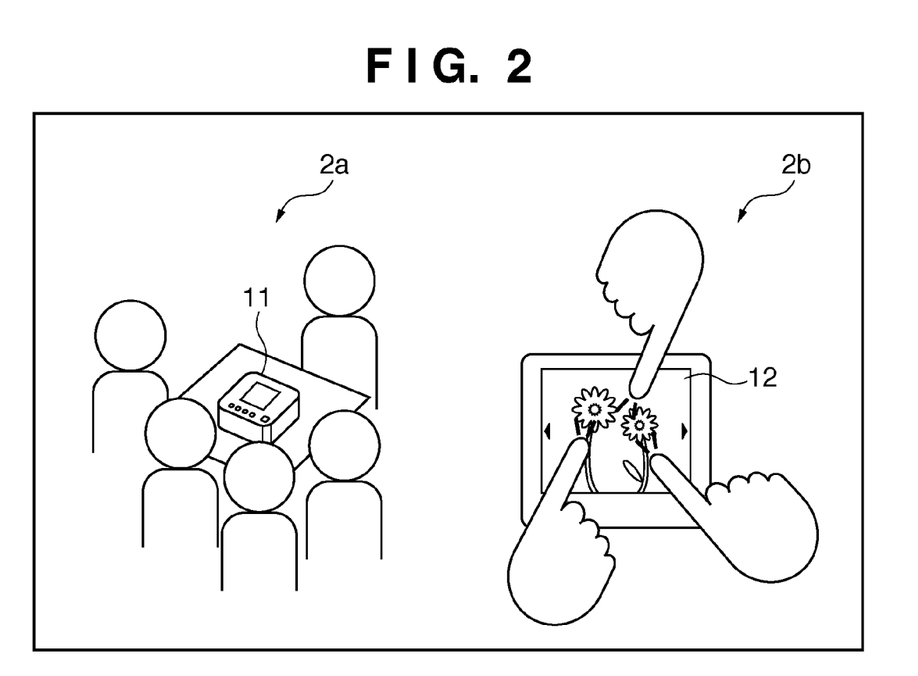
FIG. 2 is an explanatory diagram of an example of a state of use illustrating the appearance of the print apparatus according to the first embodiment of the present invention in a condition of use.

FIG. 2 is a diagram illustrating a situation in which the print apparatus according to embodiment 1 of the present invention is being used by a plurality of users.

Label 2a of FIG. 2 illustrates an aspect in which a plurality of users execute print reservations by supplying instruction inputs for print objects that are targets to be output. Also, label 2b of FIG. 2 illustrates an aspect in which print objects are displayed on a touch panel (screen) 12, and a plurality of users execute print reservations for the displayed print objects through touch operations on the touch panel (screen) 12.

Figure 3:
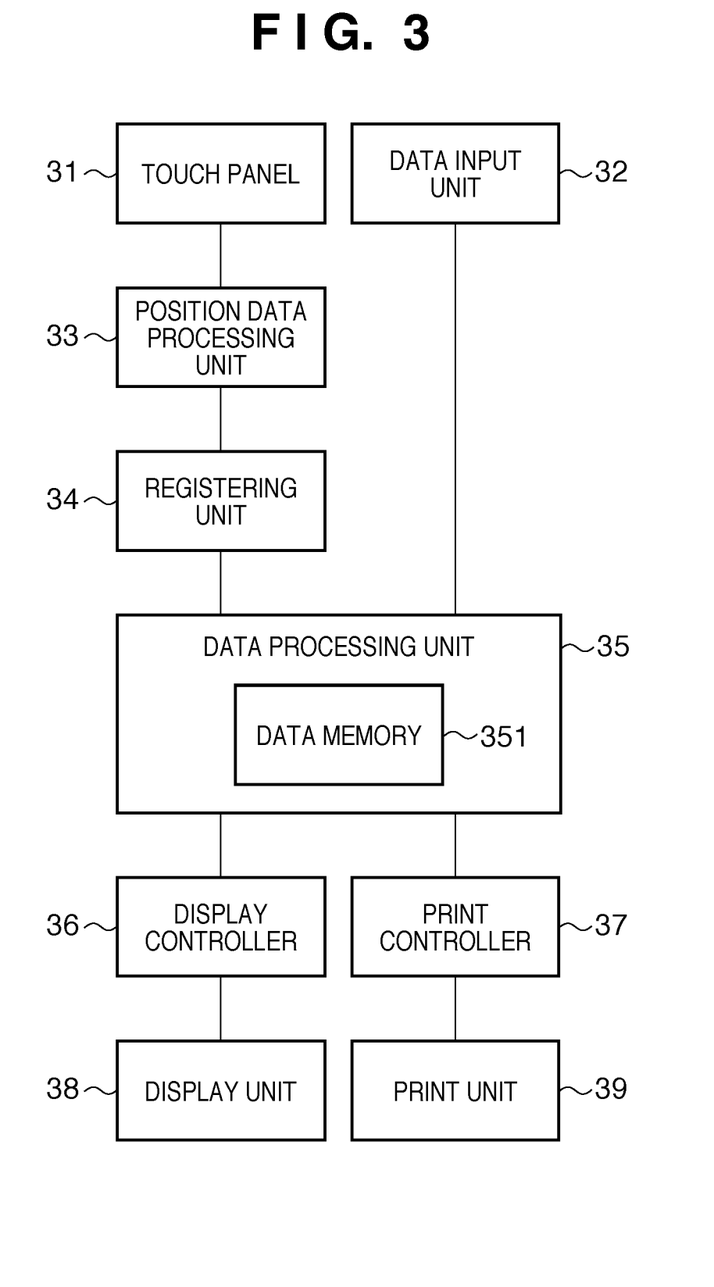
FIG. 3 is a diagram illustrating structural blocks of the print apparatus according to the first embodiment of the present invention.

FIG. 3 is a diagram illustrating the relation between each structural block of the print apparatus according to the first embodiment.

Although it is not shown in FIG. 3, the print apparatus is provided with a CPU (Central Processing Unit) 30, which controls all of the structural blocks below.

A touch panel (screen) 31, which is an input unit, executes operations of the device such as menu selection, screen display, print settings, etc. The touch panel (screen) 31 also executes detection of the type and coordinates of a finger or pen of a user who executed a touch operation, and further executes classification of the user who executed the touch operation. A data input unit 32 is for inputting data of an image or the like. The data input unit 32 is comprised of a drive for reading a storage medium such as a memory card or CD-ROM, an image sensing apparatus such as a digital camera or the like, or an apparatus for inputting data from an external apparatus through a communication line.

A location data processing unit 33 receives a user's touch operation on the touch panel (screen) 31, processes the output instruction location data, and classifies the user. Furthermore, the processed location data is output as various setting data for operations such as screen display and printing, etc.

A registering unit 34 registers various setting data after associating it with each user classification from the location data processing unit 33. Information such as user information, print object for which a print reservation was made by each user, print format, print size, etc., is saved in the registering unit 34. Data that supplements the operation of the touch panel such as characters, buttons, menus, etc., is also saved in advance.

A data processing unit 35 extracts necessary items from the contents of a data memory 351 with reference to the data in the registering unit 34 based on the instruction location from the location data processing unit 33, and transfers the data to a display controller 36 and print controller 37.

The data memory 351 is a memory that processes output data from the data input unit and saves it, and data of images and characters of various formats are saved here.

The display unit is comprised of a display controller 36 and display unit 38. The display controller 36 generates a signal to display on the touch panel (screen) 31 based on an instruction from the CPU 30.

The display unit 38 is a display unit of the touch panel (screen) 31, and displays a screen for receiving a user instruction on the background of the touch panel. The display unit 38 is comprised of a liquid crystal display apparatus or the like, and the stored contents of the data memory 351, and characters, buttons, menus, etc., that are built into the setting memory in advance and supplement operation of the touch panel are displayed.

The print controller 37 executes output to the print unit 39.

The print unit 39 executes printing of the print object. The print unit 39 is comprised of a thermal transfer printer or ink jet printer, etc., and prints the stored contents in the data memory 351 in accordance with user settings stored in the registering unit 34.

Figure 4:
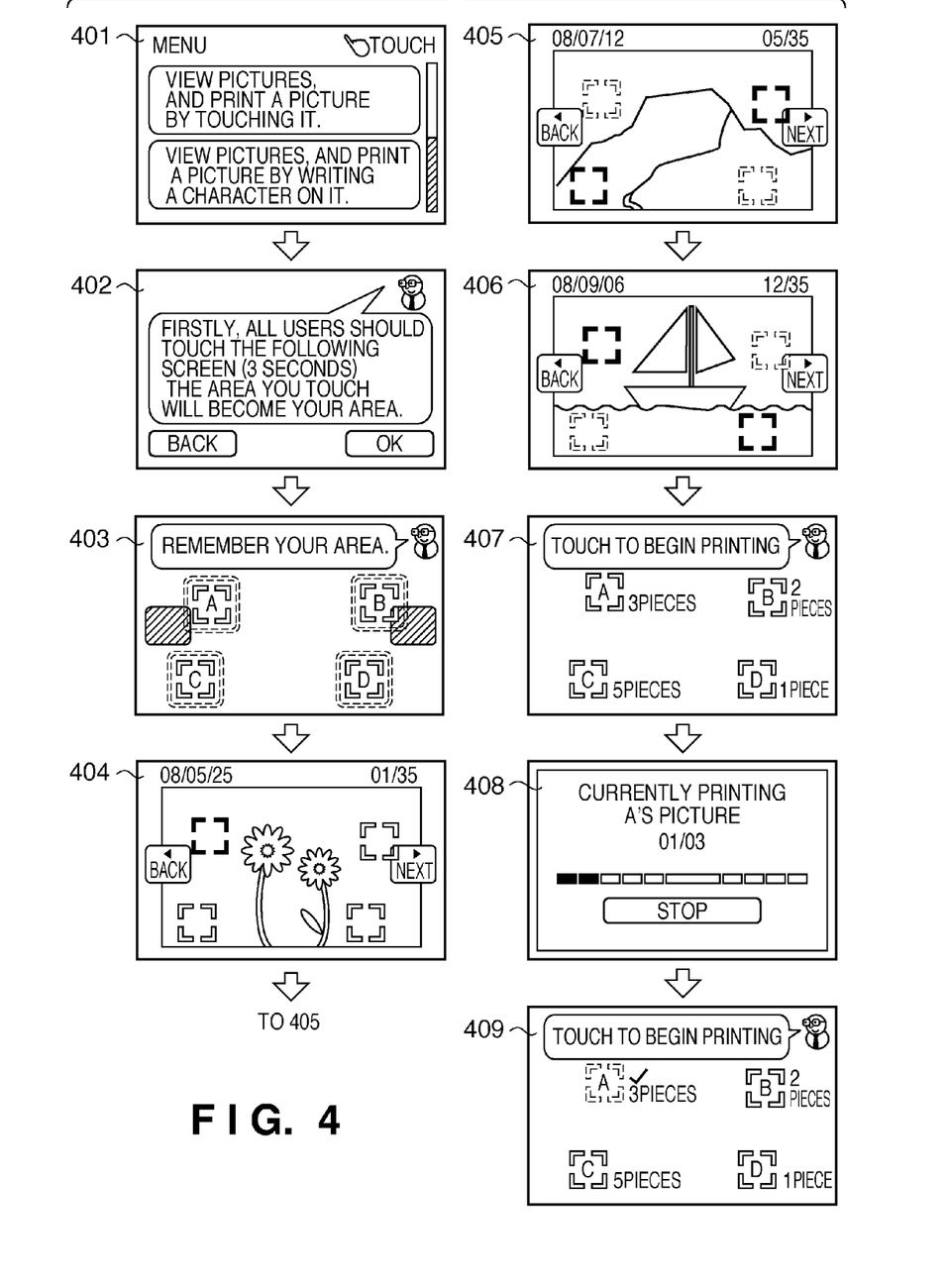
FIG. 4 is a diagram illustrating transitions to GUI screens when the print apparatus according to the first embodiment of the present invention is used.

FIG. 4 is a diagram illustrating transitions of the GUI displayed on the touch panel (screen) 31 when a plurality of users use the print apparatus according to the first embodiment.

In the first embodiment, two or more users execute print reservations for each image (print object) sequentially displayed on the touch panel (screen) 31. Then, after image display is complete, each user goes through a process in which the print objects print reserved by the users are printed (hereinafter called a "print reservation process by two or more users") by each user executing a print reservation.

In the initial screen 401, the display controller 36 displays an initial screen under the control of the CPU 30, and the user is notified of entrance into the aforementioned "print reservation process by two or more users". When a user makes a selection to enter "print by touching a picture to be printed while looking at the pictures", or "print reservation process by two or more users" on the initial screen 401, the screen transitions to the screen 402.

In the screen 402, the display controller 36 displays a screen to prompt all users to touch the screen. When there is a touch operation on the screen by a user that lasts a predetermined amount of time (such as 3 seconds, for example), the touch panel (screen) 31 transitions to the screen 403.

In the screen 403, the display controller 36 displays the location each user should touch to make a print reservation for a print object based on the users' screen-touches. The location data processing unit 33 classifies each user based on touch operations to the predetermined locations, and the registering unit 34 stores a print reservation for each user. Moreover, when the print apparatus of the present invention has a separate input unit to be hereinafter described, the screen 402 and screen 403 can be omitted.

In the screen 404, when there is a predetermined operation by a user such as a touch of the "next" button or the like, the display controller 36 displays a screen transitioned from the screen 403, that is, displays an image that is the print object. In the present screen, the display controller 36 displays the image data read in from the data input unit 32, and also overlaps and displays locations (those displayed on the screen 403) that each user should touch to make a print reservation using a translucence effect or the like.

In the screen 405 and screen 406, when there is a predetermined operation by a user such as a touch of the "next" button or the like, the display controller 36 displays a screen that sequentially transitions from the screen 404. This screen is the same as the screen 404.

In screen 407, based on an instruction from the CPU 30, the display controller 36 displays this screen after the sequential display of images is complete such as when the image data read in from the data input unit 32 is finished, and prompts printing of the print objects for which a print reservation has been made. In the present screen, the location each user should touch in order to give a print instruction is displayed. The locations are the same locations that each user should touch to give a print instruction in the screen 404 to screen 406. That is, the input unit that classifies a user who made a print reservation is identical with the input unit that classifies a user who gave a print instruction. By this, it is possible for each user who gave a print instruction to know the number of copies of each instruction by looking at this screen. Furthermore, the print objects for which a print reservation was made can be printed all at once for each user, and there is no necessity for a user to sort the printed materials after printing. The data processing unit 35 collects print objects, for which print reservations where made by each user in a scattered manner, for each user and processes them.

In a print progress screen 408, when there is a print instruction by a single user, the CPU 30 receives the print instruction, and outputs all the print objects corresponding to the classification of that user at once. Furthermore, the display controller 36 displays "currently printing A's picture" or the like on the screen so that the state in which a print object for which the user has made a print reservation is being printed can be known. This screen is commonly called a "print progress screen". When printing of the user's print object for which a print instruction has been given is complete, the process transitions to the screen 409.

In the screen 409, the display controller 36 displays a screen to give a notification that printing based on the print instruction of the screen 407 is complete. The same operation as in the screen 407 is executed in the case that another user executes a print instruction.

Furthermore, when the print instructions of all users are complete and there is a predetermined operation by a user such as a touch of an "end" button, the display controller 36 either executes display of the initial screen of the initial screen 401, or ends the screen display. Then, the user is notified that all printing is complete.

Figure 5:
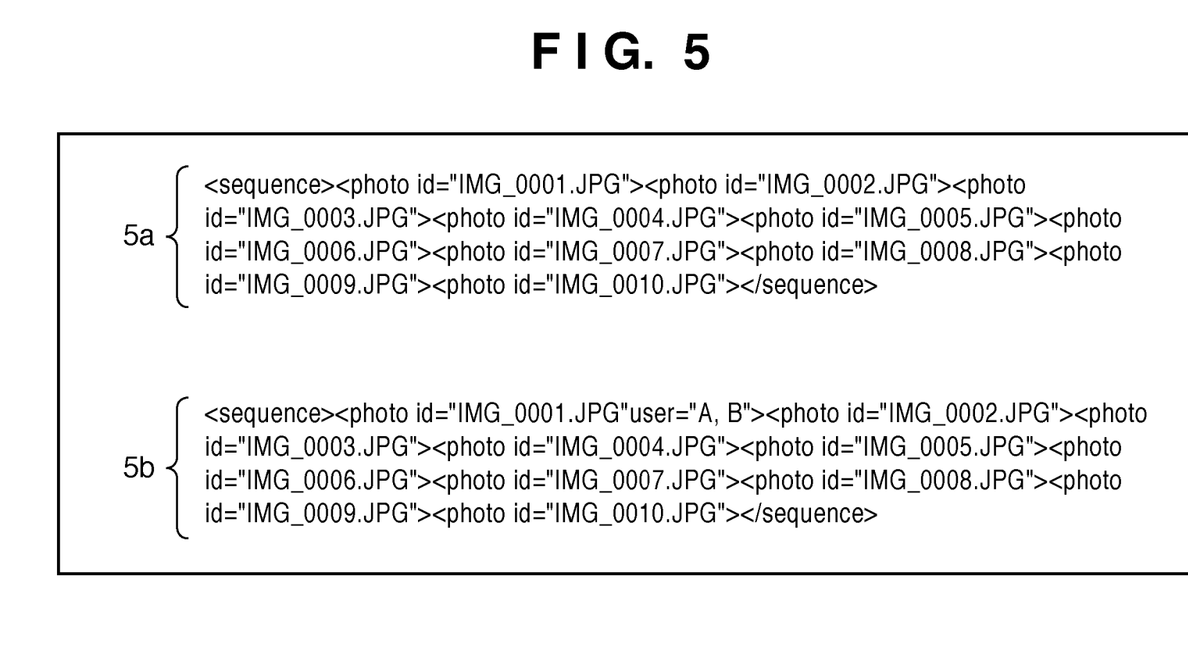
FIG. 5 is a diagram illustrating an example of a data structure for retention in a setting memory of the print apparatus according to the first embodiment of the present invention.

FIG. 5 is a diagram illustrating the data structure when relevant data is retained in the registering unit 34 of the print apparatus of the first embodiment. That is, when two or more users execute a print reservation for each image in a "print reservation process by two or more users", a data structure such as that shown in FIG. 5 is retained in the registering unit 34 as data relevant to the image data for which those print reservations were made. As shown in FIG. 5, the data has a structure described by the XML (eXtensible Markup Language) format.

Label 5*a* in FIG. 5 represents that the image data as the sequentially displayed print objects are IMG_0001.JPG to IMG_0010.JPG.

Label 5*b* in FIG. 5 represents that the users who made print reservations for the image data IMG_0001.JPG are A and B.

Figure 6:
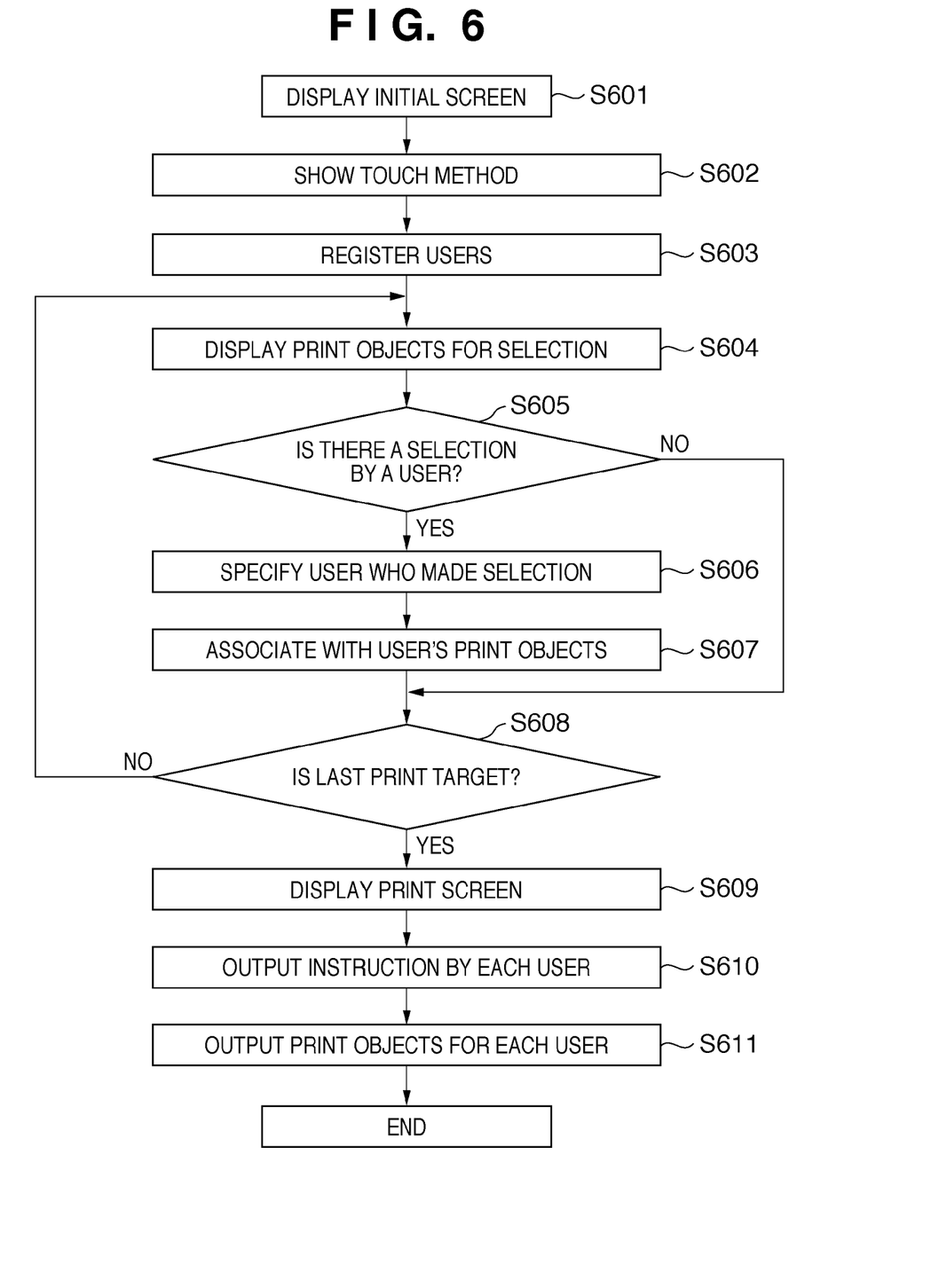
FIG. 6 is a flowchart of operations when using the print apparatus according to the first embodiment of the present invention.

FIG. 6 is a flow diagram illustrating the flow of processing when "print reservation process by two or more users" is executed in the print apparatus of the first embodiment of the present invention.

Step S601: the display controller 36 displays the initial screen 401 on the touch panel (screen) 31. Using this, the user selects a method to output a print object from among a method of selection by touching a picture or a method of writing characters of user's initial on a picture. It is presumed in this case that the touch method has been selected.

Step S602: the CPU 30 of the print apparatus displays a screen 402 to explain how to touch and to prompt a touch. The user executes a touch operation on the screen 402 to determine his own touch area.

Step S603: approximately 3 seconds later, a screen 403 is displayed so that each of the plurality of users can remember the area he touched. User registration is now complete.

Step S604: when the OK button of the screen 403 is touched by a user, the display controller 36 sequentially displays screens of a plurality of print objects on the touch panel (screen) 31. Firstly, the screen 404 is displayed. Each of the plurality of users touches his own area that he remembers from the screen 403 in the case that the print object on this screen is necessary. When selection is complete, the users touch "next".

However, in the event that a specific user is in a hurry to output a print object, the user may touch a button (not shown) to transition to printing before the users make a selection for all the print objects, that is, at this point in time, and the process may transition to S609.

Step S605: when a predetermined operation is executed by a user such as touching the "next" button, the CPU 30 determines whether or not there was a selection of a print object by a user.

In the case that it is determined that there was a selection, the process transitions to S606.

In the case that there was no selection, the process transitions to S608.

Step S606: the location data processing unit 33 determines which user selected this print object from the area of the touch panel touched by the user.

Step S607: the CPU 30 registers that determination result in the registering unit 34.

Step S608: the CPU 30 determines whether or not there are more print objects to display to the users. In the case that there are no more print objects, the process transitions to S609. In the case that there are still print objects, the process returns to S604, and the steps of S604 and S605 are repeated. By this, the screen 405 and screen 406 are displayed, and the user who selected each print object is registered.

Step S609: the display controller 36 displays the screen 407, notifies the users of the number of print objects selected by each user, and notifies the users that print preparation is complete.

Step S610: user A touches his own area that he remembers from screen 403.

Step S611: the print controller 37 prints user A's three selected print objects. In parallel to this, the display controller 36 displays a screen 408 that displays the processing situation of printing, for example, "printing A's picture" "page 1/3", etc., on the display unit 38. When printing is complete, the display controller 36 displays a screen 409 to prompt printing of a print object to the next user. In the screen 409, completion of execution of user A's print instruction is displayed by a check mark.

When the print instructions of all users are complete, and there is a predetermined operation by a user such as touching the "next" button, the CPU 30 either executes display of the initial screen 401, or ends the screen display.

Moreover, in the present example, print objects were displayed one at a time on the touch panel, and selection was done by a user touching a predetermined area on the touch panel. However, in the case that a method of selecting a method to print by a user writing characters of user's initials on a picture is used, for example, four print objects are displayed by dividing the touch panel screen into four. It is then possible for a user to select a print object by writing a character on a desired print object displayed on the touch panel. By this, it is possible to reduce the time of user selection.

In the aforementioned manner, after each user has specified in advance a location on the touch panel to touch, when that user touches the location and executes an output reservation, the user's output is executed by that user touching the location he is to touch in the case of executing an output instruction as well. By this, output can be done for each user, and it is possible to manage the output materials. Furthermore, when the targets to be output are pictures, and printing is done on photo paper or the like, it is possible to solve the problem that the output reservations of all users get executed in bulk and the output materials of each user become mixed up, and the users must reconfirm the output materials.

<Second Embodiment>

The information processing apparatus of the present embodiment can be provided with an input unit, and may be an apparatus that can classify for each user various instruction inputs through each user's touch panel.

Figure 7:
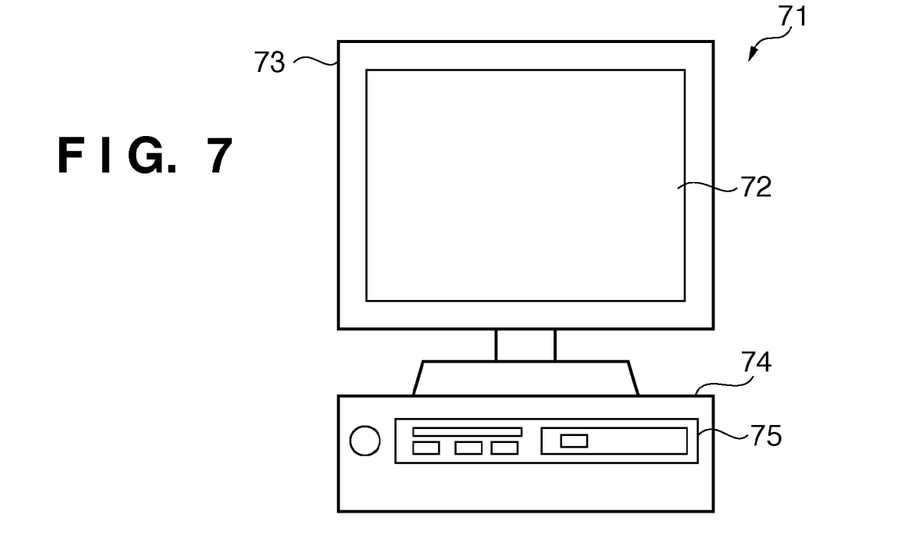
FIG. 7 is a diagram illustrating an example of the external appearance of the information processing apparatus according to the second embodiment of the present invention.

FIG. 7 is a diagram illustrating an example of the external appearance of the information processing apparatus according to the second embodiment.

The information processing apparatus 71 is provided with a display unit 73, touch panel 72, controller 74, and external connection unit 75.

The touch panel 72 displays a screen necessary for an operation saved in advance in the controller 74, as well as data such as a document such as a paper or the like, audio/music, pictures/moving images, etc.

The controller 74 is comprised of a CPU as a control unit, memory that stores a control program and screen necessary for an operation, and memory (RAM) that stores all data input from the touch panel 72, etc.

The external connection unit 75 is a unit that executes input/output of data through a handheld storage medium such as an SD card, hard disk, USB memory, CD, etc., or through an external communication means such as electronic mail or infrared communication.

The information processing apparatus 71 sequentially displays on the touch panel 72 data of a document such as a paper, audio/music, pictures/moving images, etc., obtained through the controller 74 or external connection unit 75. The data of a document such as a paper, audio/music, pictures/moving images, etc., is commonly called contents, and is the target that is output in the case that a user so wishes. The data of a document such as a paper, audio/music, pictures/moving images, etc., that is the aforementioned object to be output in the present invention is called a "object to be output".

A user who wishes to output an object to be output displayed on the touch panel 72 executes an output reservation by a touch operation to the touch panel 72.

The information processing apparatus 71 has an input unit (not shown), and because the touch operations of each user can be classified, it is possible to sort the output reservations by user and manage them. When a user who wishes to output his own reserved object to be output executes an output instruction, the information processing apparatus 71 executes output.

Furthermore, the information processing apparatus according to the second embodiment may have a form shown in FIG. 8 to FIG. 11.

Figure 8:
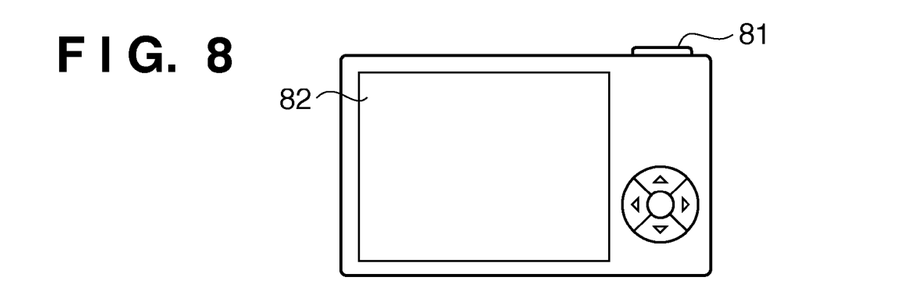
FIG. 8 is a diagram illustrating an example of the external appearance of the image sensing apparatus according to the second embodiment of the present invention.

FIG. 8 is a diagram illustrating another example of an image sensing apparatus according to the second embodiment.

The image sensing apparatus 81 sequentially displays as targets to be output images/moving images saved inside the image sensing apparatus 81, or images/moving images saved in an external memory through an external connection unit on the touch panel 82. A user who wishes to output a displayed object to be output executes an output reservation by executing a touch operation to the touch panel 82.

Furthermore, the image sensing apparatus 81 can classify the output reservations of each user by an unshown input unit, and can sort output reservations by user and manage them.

Figure 9:
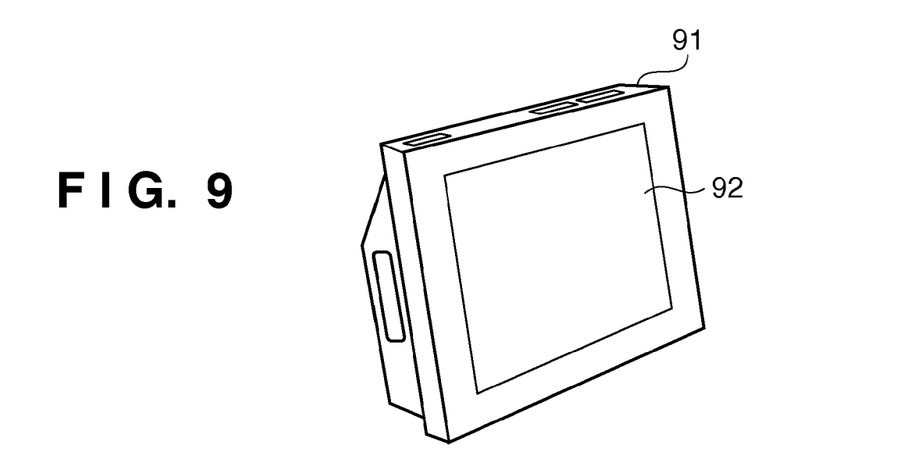
FIG. 9 is a diagram illustrating an example of the external appearance of the image display apparatus according to the second embodiment of the present invention.

FIG. 9 is a diagram illustrating yet another example of an image display apparatus according to the second embodiment. Here, an image display apparatus is an apparatus that can sequentially display an image/moving image obtained through an external connection unit or the like on a display, and is a device called a digital photo frame or the like.

The image display apparatus 91 sequentially displays as targets to be output images/moving images saved inside the image display apparatus 91, or images/moving images saved in an external memory through an external connection unit on the touch panel 92. A user who wishes to output a displayed object to be output executes an output reservation by executing a touch operation to the touch panel 92.

Furthermore, the image display apparatus 91 can classify the output reservations of each user by an unshown input unit, and can sort output reservations by user and manage them.

Figure 10:
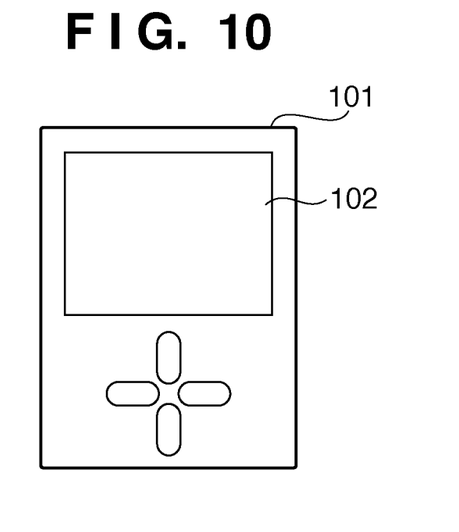
FIG. 10 is a diagram illustrating an example of the external appearance of the music playback apparatus according to the second embodiment of the present invention.

FIG. 10 is an external appearance diagram illustrating an example of a music playback apparatus according to the second embodiment. Here, a music playback apparatus is an apparatus that can display images/moving images obtained through an external connection unit or the like on a display and play back music files, and is a device called a music player or media player, etc.

The music playback apparatus 101 sequentially displays as targets to be output images/moving images/music files saved inside the music playback apparatus 101, or images/moving images/music files saved in an external memory through an external connection unit on the touch panel 102. A user who wishes to output a displayed object to be output executes an output reservation by executing a touch operation to the touch panel 102. The music playback apparatus 101 can classify the output reservations of each user by an unshown input unit, and can sort output reservations by user and manage them.

Figure 11:
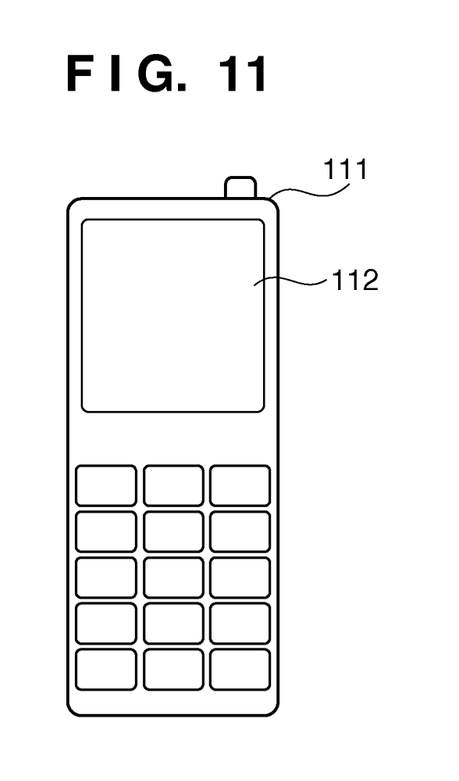
FIG. 11 is a diagram illustrating an example of the external appearance of the mobile phone according to the second embodiment of the present invention.

FIG. 11 is a diagram illustrating an example of a mobile phone according to the second embodiment.

The mobile phone 111 sequentially displays as targets to be output images/moving images/music files saved inside the mobile phone 111, or images/moving images/music files saved in an external memory through an external connection unit on the touch panel 112. A user who wishes to output a displayed object to be output executes an output reservation by executing a touch operation to the touch panel 112. The mobile phone 111 can classify the output reservations of each user by an unshown input unit, and can sort output reservations by user and manage them.

<Third Embodiment>

As explained in the first embodiment, the input unit of the present invention specifies in advance a location on the touch panel that each user should touch, and that user executes an output reservation or output instruction by touching the location. However, a change to the following configuration can easily be made without deviating from the effect of the present invention.

As one configuration of the input unit, a display apparatus provided with the image import function disclosed in Japanese Patent Laid-Open No. 2006-343514 can be used as the touch panel of the information processing apparatus of the present invention.

According to this display apparatus, fingerprint authentication of a user's fingerprint pattern or specification of the direction of a finger on the screen is possible from a screen scan image during a touch operation to the screen, and it is possible to classify two or more users.

Furthermore, as another configuration of the input unit, the touch panel disclosed in Japanese Patent Laid-Open No. 2003-345511 can be used as the touch panel of the information apparatus of the present invention.

According to this touch panel, determination of the area of a detected point detected during an operation to the touch panel is possible, and classification of two or more users is possible by, for example, executing a touch operation using indicator pens with different contact areas for each user.

Furthermore, the touch panel disclosed in Japanese Patent Laid-Open No. 2008-171066 can be used as the touch panel of the information processing apparatus of the present invention. According to this touch panel, input of shape information to the touch panel or recognition of a hand-written gesture is possible, and classification of two or more users is possible by, for example, executing input of hand-written gestures that are different for each user.

User classification of the information processing apparatus of the present invention is not limited to a means through a touch panel, and a means such as voice recognition may also be used. According to the voice recognition unit disclosed in Japanese Patent Laid-Open No. 2000-181292, determination of whether or not a recognized voice matches a registered word is possible, and classification of two or more users is possible by, for example, using different words for each user such as a name or the like.

Furthermore, according to the voice recognition unit disclosed in Japanese Patent Laid-Open No. 2007-241130, individuals can be specified by a voiceprint, and classification of two or more users is possible.

Figure 12:
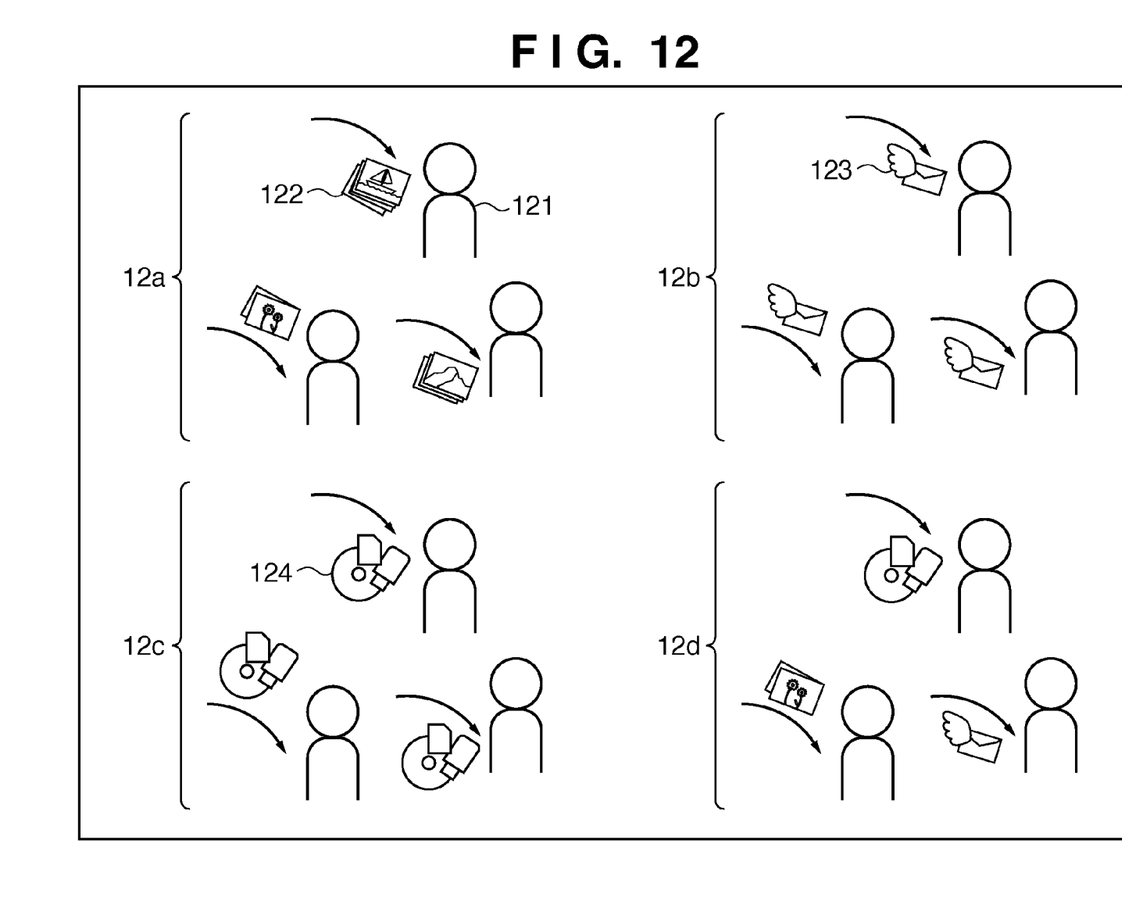
FIG. 12 is a diagram explaining an example of the output forms of the information processing apparatus according to the third embodiment of the present invention.

FIG. 12 is a diagram explaining an example of an output configuration of the information processing apparatus according to the third embodiment.

As shown by label 12a of FIG. 12, output of targets to be output for which each user 121 made a print reservation can be done by printing to a sheet medium such as a photo paper 122 or the like.

It is also possible to output electronic data through an external connection unit.

For example, as shown by label 12b of FIG. 12, an electronic mail sending unit can be installed in the print apparatus of the present invention, and output can be done as electronic mail 123 to a registered email address. Furthermore, an external communication unit can be installed through a wireless communication means such as infrared communication or the like, or a communication cable or the like, and output can be done to a memory of an external device such as a PC.

Furthermore, as shown by label 12c of FIG. 12, a data output unit can be installed in the print apparatus, and output to a handheld storage medium 124 such as a memory card, USB memory, CD, DVD, etc., is possible. Also, as shown by label 12d of FIG. 12, this output configuration is not limited to any single configuration, and the output configuration can be changed for each user.

As explained above, according to the present invention, because output reservations of each user are classified by the input unit, it is possible to sort the output reservations by user and manage them.

<Other Embodiments>

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-312491, filed Dec. 8, 2008, which is hereby incorporated by reference herein in its entirety.

What is claimed is:

1. An information processing apparatus, comprising:
a display unit for displaying targets to be output;
an input unit comprising a touch panel and that receives a plurality of instruction inputs, each input corresponding to one of a plurality of separate, non-overlapping touch areas on the touch panel, and each input corresponding to a user touching the touch area for the purpose of print reservation of a target displayed at the time;
a determination unit for determining the classifications of said plurality of instruction inputs; and
a print out unit for bulking said targets to be output for each classification determined by said determination unit and printing out said targets,
wherein said determination unit classifies the instruction inputs for each touch area on which the instruction inputs are received; and
when print instruction is made by user touch operation on to any one of the plurality of touch areas on the touch panel, said print out unit prints all the targets for which the print reservation was made by the same touch area being touched.

2. The information processing apparatus according to claim 1, wherein
said print out unit prints out different output configurations for each said classification.

3. A control method for an information processing apparatus, comprising the following steps of:
a displaying step of displaying targets to be output;
a receiving step of receiving on a touch panel a plurality of instruction inputs, each input corresponding to one of a plurality of separate, non-overlapping touch areas on the touch panel, and each input corresponding to a user touching the touch area for the purpose of print reservation of a target displayed at the time;

a determining step of determining the classifications of said plurality of instruction inputs; and a printing out step of bulking said targets to be output for each classification determined by said determination unit and printing out them, and wherein, in the determining step, the instruction inputs are classified for each touch area on which the instruction inputs are received; and when print instruction is made by user touch operation on to any one of the plurality of touch areas on the touch panel, in the printing out step, all the targets are printed for which the print reservation was made by the same touch area being touched.

4. A program that causes a computer to execute the control method of the information processing apparatus described in claim 3.

5. A non-transitory computer-readable storage medium that stores the program described in claim 4.

6. A print apparatus, comprising:

a display unit for displaying print objects;

an input unit comprising a touch panel and that receives a plurality of instruction inputs, each input corresponding to one of a plurality of separate, non-overlapping touch areas on the touch panel, and each input corresponding to a user touching the touch area for the purpose of print reservation of a print object displayed at the time;

a determination unit for determining the classifications of said plurality of instruction inputs; and a print out unit for bulking said print objects for each classification determined by said determination unit and printing out said print objects, and wherein said determination unit classifies the instruction inputs for each touch area on which the instruction inputs are received; and when print instruction is made by user touch operation on to any one of the plurality of touch areas on the touch panel, said print out unit prints all the print objects for which the print reservation was made by the same touch area being touched.

7. A control method for a print apparatus, comprising the following steps of:

a displaying step of displaying print objects;

a receiving step of receiving on a touch panel a plurality of instruction inputs, each input corresponding to one of a plurality of separate, non-overlapping touch areas on the touch panel, and each input corresponding to a user touching the touch area for the purpose of print reservation of a print object displayed at the time;

a determining step of determining the classifications of said plurality of instruction inputs; and a printing out step of bulking said print objects for each classification determined by said determination unit and printing out them, and wherein, in the determining step, the instruction inputs are classified for each touch area on which the instruction inputs are received; and when print instruction is made by user touch operation on to any one of the plurality of touch areas on the touch panel, in the printing out step, all the targets are printed for which the print reservation was made by the same touch area being touched.

\* \* \* \* \*